United States Patent
Li

(10) Patent No.: US 11,469,668 B2
(45) Date of Patent: Oct. 11, 2022

(54) STEP-UP SWITCHING CONVERTER AND CONTROL CIRCUIT AND METHOD THEREOF

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 38 days.

(21) Appl. No.: 17/328,653

(22) Filed: May 24, 2021

(65) Prior Publication Data

US 2021/0384829 A1    Dec. 9, 2021

(30) Foreign Application Priority Data

Jun. 9, 2020    (CN) .......................... 202010515990.8

(51) Int. Cl.
*H02M 3/158* (2006.01)
*H02M 1/08* (2006.01)
*H02M 1/088* (2006.01)
*H02M 1/00* (2006.01)

(52) U.S. Cl.
CPC ............. *H02M 3/158* (2013.01); *H02M 1/08* (2013.01); *H02M 1/088* (2013.01); *H02M 1/0003* (2021.05)

(58) Field of Classification Search
CPC .... H02M 1/0003; H02M 1/0006; H02M 1/08; H02M 1/088; H02M 1/38; H02M 3/158; H02M 3/1588
See application file for complete search history.

(56) References Cited

U.S. PATENT DOCUMENTS

| | | | |
|---|---|---|---|
| 9,391,467 B2* | 7/2016 | Zhao | H02J 7/007184 |
| 10,686,381 B1* | 6/2020 | Zhang | H02M 3/1588 |
| 2010/0301824 A1* | 12/2010 | Yamamoto | H02M 3/156 |
| | | | 323/283 |
| 2017/0126129 A1* | 5/2017 | Li | H02M 3/158 |
| 2020/0021188 A1* | 1/2020 | Xi | H02M 3/156 |

* cited by examiner

*Primary Examiner* — Matthew V Nguyen
(74) *Attorney, Agent, or Firm* — Perkins Coie LLP

(57) ABSTRACT

A control circuit and control method for controlling a step-up switching converter. The control circuit has an ultra-low voltage regulation module used to generate a control signal based on an output voltage feedback signal and an input voltage signal. When the input voltage signal is smaller than an ultra-low voltage threshold, the control signal controls a high side switch of the step-up switching converter off and controls a low side switch of the step-up switching converter to perform on and off switching. Meanwhile, a parasitic diode of the high side switch is on once the low side switch is off.

18 Claims, 6 Drawing Sheets

STEP-UP SWITCHING CONVERTER AND CONTROL CIRCUIT AND METHOD THEREOF

CROSS-REFERENCE TO RELATED APPLICATION

This application claims the benefit of CN application No. 202010515990.8, filed on Jun. 9, 2020, and incorporated herein by reference.

TECHNICAL FIELD

The present invention generally refers to electrical circuit, and more particularly but not exclusively refers to step-up switching converter with ultra-low input voltage and associated control circuit and method.

BACKGROUND

In recent years, with continuous development of wireless sensor network, portable and wearable devices, smart-home devices and biomedical technologies etc., the collection and utilization of small power energy has attracted widespread attention, and the step-up switching converters are widely used in these energy collection applications.

As a bridge connection between power source and load, step-up switching converters need to solve a number of design challenges. For example, some energy collection applications, such as thermoelectric generators, solar panels etc., can only provide an output voltage with a few tens of millivolts to a step-up switching converter. However, the step-up switching converter still needs to maintain a normal operation at such an ultra-low input voltage.

Therefore, it is desired to have a control scheme and associated control method for a step-up switching converter having an ultra-low input voltage signal.

SUMMARY

Embodiments of the present invention are directed to a control circuit for controlling a step-up switching converter, the control circuit comprising a regular voltage regulation module and an ultra-low voltage regulation module. The regular voltage regulation module is configured to receive a voltage feedback signal indicative of an output voltage signal of the step-up switching converter to generate a first control signal. The ultra-low voltage regulation module is configured to receive the voltage feedback signal and an input voltage signal of the step-up switching converter to generate a second control signal. When the input voltage signal is larger than an ultra-low voltage threshold, the first control signal is configured to control a high side switch and a low side switch of the step-up switching converter to perform on and off switching. When the input voltage signal is smaller than the ultra-low voltage threshold, the second control signal is configured to turn the high side switch off and to control the low side switch to perform on and off switching. When the low side switch is turned off, a parasitic diode of the high side switch is turned on.

Embodiments of the present invention are directed to a step-up switching converter comprising a high side switch, a low side switch, a regular voltage regulation module and an ultra-low voltage regulation module. The regular voltage regulation module is configured to receive a voltage feedback signal indicative of an output voltage signal of the step-up switching converter to generate a first control signal. The ultra-low voltage regulation module is configured to receive the voltage feedback signal and an input voltage signal of the step-up switching converter to generate a second control signal. When the input voltage signal is larger than an ultra-low voltage threshold, the first control signal is configured to control the high side switch and the low side switch to perform on and off switching. When the input voltage signal is smaller than the ultra-low voltage threshold, the second control signal is configured to turn the high side switch off and to control the low side switch to perform on and off switching. When the low side switch is turned off, a parasitic diode of the high side switch is turned on.

Embodiments of the present invention are directed to a control method for controlling a step-up switching converter, the control method comprising several steps. The first step is determining whether an input voltage signal of the step-up switching converter is smaller than an ultra-low voltage threshold. The first step is generating a first control signal based on a voltage feedback signal indicative of an output voltage signal of the step-up switching converter when the step-up switching converter is larger than the ultra-low voltage threshold. The first control signal is configured to control a high side switch and a low side switch of the step-up switching converter to perform on and off switching. The second step is generating a second control signal based on the voltage feedback signal and an input voltage signal of the step-up switching converter when the step-up switching converter is smaller than the ultra-low voltage threshold. The second control signal is configured to turn the high side switch off and to control the low side switch to perform on and off switching. When the low side switch is turned off, a parasitic diode of the high side switch is turned on.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
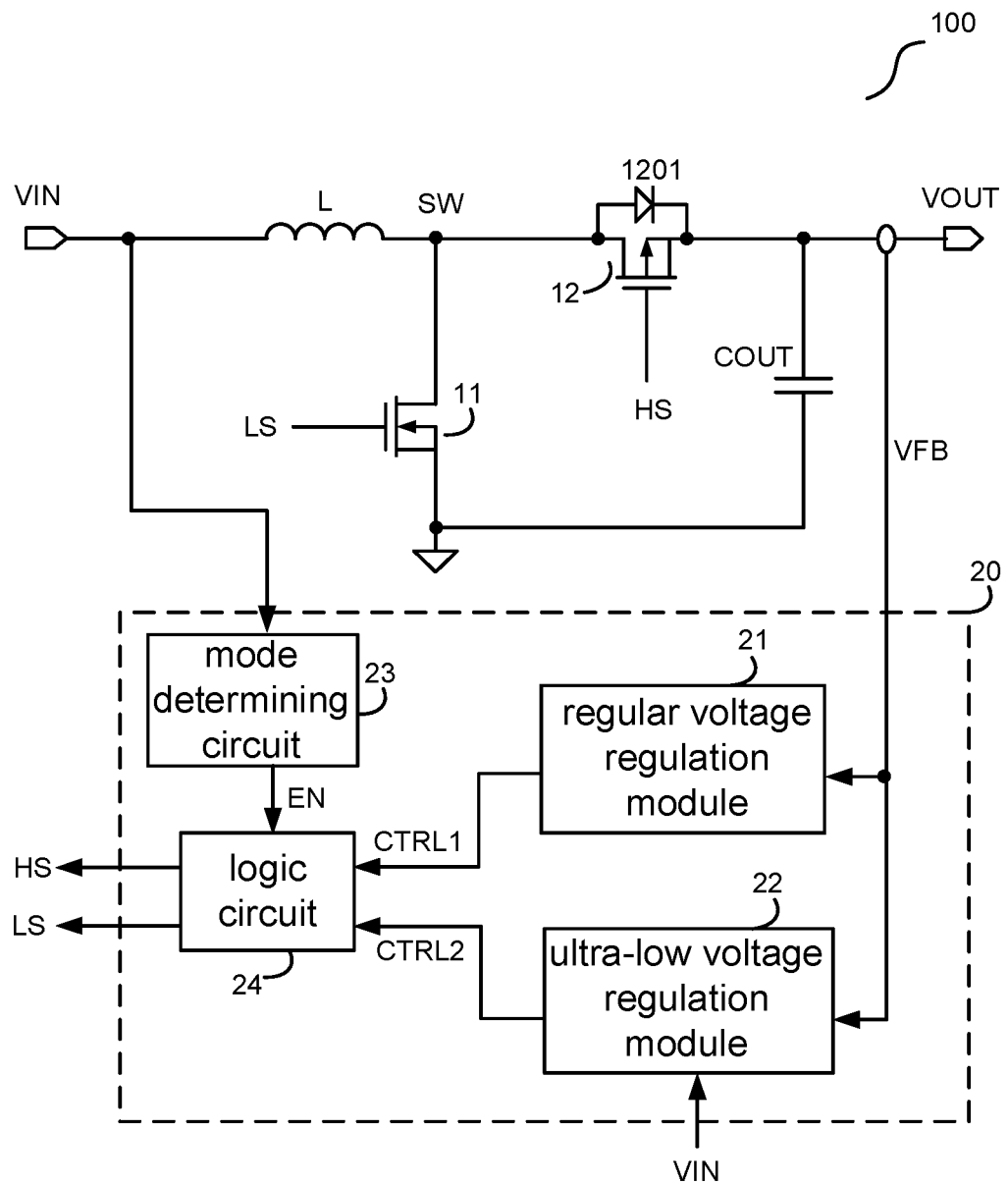
FIG. 1 illustrates a block diagram of a step-up switching converter 100 in accordance with an embodiment of the present invention.

FIG. 1 illustrates a block diagram of a step-up switching converter 100 in accordance with an embodiment of the present invention. As shown in FIG. 1, the step-up switching converter 100 may comprise an inductor L, an output capacitor COUT, a low side switch 11, a high side switch 12 and a control circuit 20. Herein, the high side switch 12 may comprise a parasitic diode 1201 having a current direction only allows a current signal flowing through an input terminal of the step-up switching converter 100 to an output terminal of the step-up switching converter 100. The input terminal of the step-up switching converter 100 is used for receiving an input voltage signal VIN, and the output terminal of the step-up switching converter 100 is used for providing an output voltage signal VOUT. In an exemplary embodiment of FIG. 1, the inductor L, the output capacitor COUT, the low side switch 11, and the high side switch 12 are illustrated to have a BOOST topology. In detail, each of the high side switch 11 and the low side switch 12 has a first terminal, a second terminal and a control terminal. The first terminal of the low side switch 11 and the first terminal of the high side switch 12 may be coupled together to constitute a common connection node SW. The second terminal of the low side switch 11 is connected to a logic ground. The second terminal of the high side switch 12 may be coupled to the output terminal of the step-up switching converter 100. The inductor L may be coupled between the input terminal of the step-up switching converter 100 and the common connection node SW. The output capacitor COUT may be connected between the output terminal of the step-up switching converter 100 and the logic ground.

In the exemplary embodiment of FIG. 1, the low side switch 11 is illustrated as an N-type Metal Oxide Semiconductor Field Effect Transistor ("MOSFET"), and the high side switch 12 is illustrated as a P-type MOSFET. More detail, the drain of the P-type MOSFET may be operated as the first terminal of the high side switch 12, and the source of the P-type MOSFET may be operated as the second terminal of the high side switch 12. Therefore, the parasitic diode 1201 of the high side switch 12 is illustrated to have an anode connected to the common connection node SW and a cathode connected to the output terminal of the step-up switching converter 100. As can be appreciated, whereas the high side switch 12 and the low side switch 11 are illustrated as MOSFETs in FIG. 1, in other embodiment, the high side switch 12 and the low side switch 11 may comprise other suitable semiconductor devices such as Junction Field Effect Transistors ("JFETs"), Insulated Gate Bipolar Translators ("IGBTs"), Double Diffusion Metal Oxide Semiconductor ("DMOS") etc.

In the exemplary embodiment of FIG. 1, the control circuit 20 may comprise a regular voltage regulation module 21, an ultra-low voltage regulation module 22, a mode determining circuit 23 and a logic circuit 24. The step-up switching converter 100 may be configured to operate in a regular voltage regulation mode or an ultra-low voltage regulation mode.

In an embodiment, the regular voltage regulation module 21 may be configured to receive a voltage feedback signal VFB which is indicative of the output voltage signal VOUT, and further configured to generate a first control signal CTRL1 based on the voltage feedback signal VFB. The first control signal CTRL1 may be configured to control the high side switch 12 and the low side switch 11 to perform on and off switching when the step-up switching converter 100 operates in the regular voltage regulation mode. In an embodiment, the first control signal CTRL1 may comprise a logic signal with an active state (e.g., the logic high state) and an inactive state (e.g., the logic low state). In an embodiment, when the voltage feedback signal VFB is smaller than a desired reference voltage, the first control signal CTRL1 is in the active state; when the voltage feedback signal VFB is larger than the desired reference voltage, the first control signal CTRL1 is in the inactive state. In an embodiment, the desired reference signal is indicative of a desired voltage of the output voltage VOUT of the step-up switching converter 100. In an embodiment, when the first control signal CTRL1 is in the active state, the low side switch 11 is turned on and the high side switch 12 is turned off so that an inductor current signal flowing through the inductor L is increased linearly. When the first control signal CTRL1 is in the inactive state, the low side switch 11 is turned off and the high side switch 12 is turned on, the inductor current signal is freewheeling through the high side switch 12. In an embodiment, the regular voltage regulation module 21 may adopt different control schemes, e.g., a constant ON time (COT) controlled scheme, a peak current controlled scheme, an average current controlled scheme, a valley current controlled scheme, etc., to regulate the output voltage signal VOUT. Therefore, the regular voltage regulation module 21 may comprise any suitable modules for realizing different control schemes. As can be appreciated, when the regular voltage regulation module 21 adopts any one of current controlled method, the regular voltage regulation module 21 may further be configured to receive a current feedback signal which is indicative of a current signal flowing through the step-up switching converter 100. In such an application, the regular voltage regulation module 21 may be configured to generate the first control signal CTRL1 based on the voltage feedback signal VFB and the current feedback signal.

In an embodiment, the ultra-low voltage regulation module 22 may be configured to receive the voltage feedback signal VFB and the input voltage signal VIN of the step-up switching converter 100, and further configured to generate a second control signal CTRL2 based on the voltage feedback signal VFB and the input voltage signal VIN. The second control signal CTRL2 may be configured to control the high side switch 12 off and to control the low side switch 11 to perform on and off switching when the step-up switching converter 100 operates in the ultra-low voltage regulation mode. In an embodiment, the on time of the low side switch 11 is relative to a potential of the input voltage signal VIN. In an embodiment, a duration of the on time of the low side switch 11 is increased with decrease of the potential of the input voltage signal VIN, i.e., the smaller the potential of the input voltage signal VIN is, the longer the duration of the on time of the low side switch 11 is. In an embodiment, the second control signal CTRL2 may comprise a logic signal with an active state (e.g., the logic high state) and an inactive state (e.g., the logic low state). In an embodiment, when the voltage feedback signal VFB is smaller than the desired reference voltage, the second control signal CTRL2 is in the active state; when the voltage feedback signal VFB is larger than the desired reference voltage, the second control signal CTRL2 is in the inactive state. In an embodiment, when the second control signal CTRL2 is in the active state, the low side switch 11 is turned on and the high side switch 12 is turned off so that the inductor current signal flowing through the inductor L is increased linearly. When the second control signal CTRL2 is in the inactive state, the low side switch 11 is turned off while the high side switch 12 is kept off and the inductor current signal is freewheeling through the parasitic diode 1201 of the high side switch 12. For instance, in a COT controlled scheme, when the voltage feedback signal VFB is smaller than the desired reference signal, the second control signal CTRL2 may be configured to control the low side switch 11 on and the high side switch 12 off such that the inductor L is charged by the input voltage signal VIN through the low side switch 11. After a certain period, the second control signal CTRL2 may be configured to control the low side switch 11 off such that the inductor current signal IL is freewheeling through the parasitic diode 1201 of the high side switch 12. As can be appreciated, the certain period is determined by the input voltage signal VIN.

In the exemplary embodiment of FIG. 1, the mode determining circuit 23 may be configured to receive the input voltage signal VIN, and further configured to compare the input voltage signal VIN with an ultra-low voltage threshold to generate an enable signal EN. In an embodiment, the enable signal EN is configured to determine whether the step-up switching converter 100 operates in the regular voltage regulation mode or the ultra-low voltage regulation mode. In an embodiment, the enable signal EN may comprise a logic signal with an active state (e.g., the logic high state) and an inactive state (e.g., the logic low state). In an embodiment, the active state of the enable signal EN may indicate that the step-up switching converter 100 operates in the regular voltage regulation mode, while the inactive state of the enable signal EN may indicate that the step-up switching converter 100 operates in the ultra-low voltage regulation mode. In an embodiment, the mode determining circuit 23 may further comprise an input voltage feedback circuit configured to generate an input voltage feedback signal indicative of the input voltage signal VIN. In such an embodiment, the mode determining circuit 23 may be configured to receive the input voltage feedback signal, and further configured to compare the input voltage feedback signal with an enable threshold indicative of the ultra-low voltage threshold to generate the enable signal EN.

In an embodiment, the logic circuit 24 may be configured to receive the enable signal EN, the first control signal CTRL1 and the second control signal CTRL2, and further configured to conduct a logic operation of the enable signal EN, the first control signal CTRL1 and the second control signal CTRL2 to generate a high side control signal HS and a low side control signal LS. The high side control signal HS is configured to control the high side switch 12 to perform on and off switching. The low side control signal LS is configured to control the low side switch 11 to perform on and off switching. The high side control signal HS and the low side control signal LS may be logic signals having an active state (e.g., logic high) and an inactive state (e.g., logic low).

In an embodiment, when the input voltage signal VIN is larger than the ultra-low voltage threshold, the enable signal EN is configured to enable the logic circuit 24 to generate the high side control signal HS and the low side control signal LS based on the first control signal CTRL1. In such an application, the high side control signal HS is configured to control the high side switch 12 and the low side switch 11 to perform on and off switching, and the low side control signal LS is configured to control the low side switch 11 to perform on and off switching. When the input voltage signal VIN is smaller than the ultra-low voltage threshold, the enable signal EN is configured to enable the logic circuit 24 to generate the high side control signal HS and the low side control signal LS based on the second control signal CTRL2. In such an application, the high side control signal HS is configured to turn the high side switch 11 off, and the low side control signal LS is configured to control the low side switch 11 to perform on and off switching.

Figure 2:
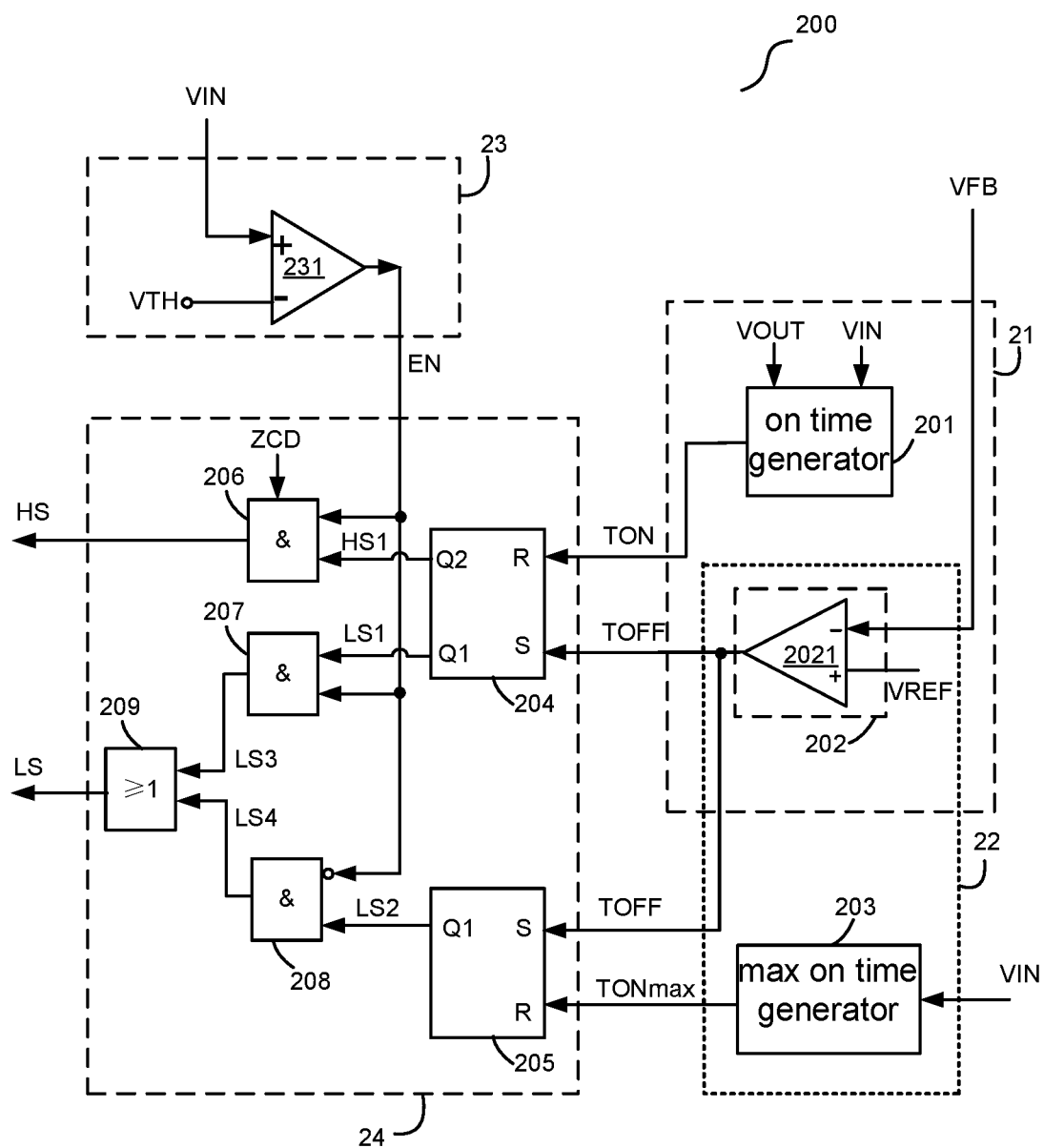
FIG. 2 schematically illustrates a step-up switching converter 200 in accordance with an embodiment of the present invention.

FIG. 2 schematically illustrates a step-up switching converter 200 in accordance with an embodiment of the present invention. In the exemplary embodiment of FIG. 2, the regular voltage regulation module 21 is illustrated as an adaptive COT controlled module. The first control signal CTRL1 may comprise an on time control signal TON and an off time control signal TOFF. In an embodiment, both the on time control signal TON and the off time control signal TOFF may be logic signals with an active state (e.g., the logic high state) and an inactive state (e.g., the logic low state). As shown in FIG. 2, the regular voltage regulation module 21 may comprise an on time generator 201 and an off time generator 202.

In the exemplary embodiment of FIG. 2, the on time generator 201 may be configured to receive the input voltage signal VIN and the output voltage signal VOUT to generate the on time control signal TON. In an embodiment, when the on time control signal TON is changed from the inactive state to the active state, the low side switch 11 is turned off and the high side switch 12 is turned on. In an embodiment, the on time control signal TON is configured to determine the duration of the on time of the low side switch 11 when the step-up switching converter 100 operates in the regular voltage regulation mode. As can be appreciated, in a regular COT controlled scheme, the on time control signal TON may be irrelevant with the input voltage signal VIN and the output voltage signal VOUT. The on time generator 201 may be configured to generate the on time control signal TON based on a default constant voltage signal, e.g., a power supply voltage signal VCC.

In the exemplary embodiment of FIG. 2, the off time generator 202 may be configured to receive the voltage feedback signal VFB and desired reference signal VREF, and further configured to compare the voltage feedback signal VFB with the desired reference signal VREF to generate the off time control signal TOFF.

In an embodiment, when the voltage feedback signal VFB is smaller than the desired reference signal VREF, the off time control signal TOFF is changed from the inactive state the active state to turn the low side switch 11 on. That is, the off time control signal TOFF is configured to determine the on moment of the low side switch 11.

In the exemplary embodiment of FIG. 2, the off time generator 202 may comprise a voltage comparator 2021 having an inverting terminal, a non-inverting terminal, and an output terminal. The inverting terminal of the voltage comparator 2021 operated as the first input terminal of the off time generator 202 is configured to receive the voltage feedback signal VFB, and the non-inverting terminal of the voltage comparator 2021 operated as the second input terminal of the off time generator 202 is configured to receive the voltage reference signal VREF. The voltage comparator 2021 may be configured to compare the voltage feedback signal VFB with the reference voltage signal VREF to generate the off time control signal TOFF at its output terminal.

In the exemplary embodiment of FIG. 2, the ultra-low voltage regulation module 22 may also comprise the off time generator 202. Besides, the ultra-low voltage regulation module 22 may further comprise a max on time generator 203. In an embodiment, the max on time generator 203 may be configured to receive the input voltage signal VIN, and further configured to generate a max on time control signal TONmax based on the input voltage signal VIN. The max on time control signal TONmax may be a logic signal with an active state (e.g., the logic high state) and an inactive state (e.g., the logic low state). In an embodiment, when the max on time control signal TONmax is changed from the inactive state to the active state, the low side switch 11 is turned off. In an embodiment, the max on time control signal TONmax is configured to determine a duration of the on time of the low side switch 11 when the step-up switching converter 100 operates in the ultra-low voltage regulation mode. In an embodiment, the duration of the on time of the low side switch 11 is increased with decrease of the potential of the input voltage signal VIN, i.e., the smaller the input voltage signal VIN is, the longer the duration of the on time of the low side switch 11 is. In such an application, the second control signal CTRL2 may comprise the off time control signal TOFF and the max on time control signal TONmax.

In the exemplary embodiment of FIG. 2, the mode determining circuit 23 may be illustrated as a voltage comparator 231 having an inverting terminal, a non-inverting terminal, and an output terminal. The inverting terminal of the voltage comparator 231 is configured to receive the ultra-low voltage threshold VTH, and the non-inverting terminal of the voltage comparator 231 is configured to receive the input voltage signal VIN. The voltage comparator 231 may be configured to compare the input voltage signal VIN with the ultra-low voltage threshold VTH to generate the enable signal EN at its output terminal. In an embodiment, the ultra-low voltage threshold VTH is smaller than 300 mV. In an embodiment, when the input voltage signal VIN is larger than the ultra-low voltage threshold VTH, the enable signal EN is in the active state to enable the step-up switching converter 100 to operate in the regular voltage regulation mode. When the input voltage signal VIN is smaller than the ultra-low voltage threshold VTH, the enable signal EN is in the inactive state to enable the step-up switching converter 100 to operate in the ultra-low voltage regulation mode.

In the exemplary embodiment of FIG. 2, the logic circuit 24 may be configured to receive the enable signal EN, the on time control signal TON, the off time control signal TOFF and the max on time control signal TONmax, and further configured to generate the high side control signal HS and the low side control signal LS based on the enable signal EN, the on time control signal TON, the off time control signal TOFF and the max on time control signal TONmax. In an embodiment, the logic circuit 24 may comprise a first RS flip-flop 204, a second RS flip-flop 205, a first AND logic gate 206, a second AND logic gate 207, a third AND logic gate 208, and a first OR logic gate 209.

The first RS flip-flop 204 may comprise a set terminal S configured to receive the off time control signal TOFF, a reset terminal R configured to receive the on time control signal TON, a first output terminal configured Q1 to provide a first low side control signal LS1 and a second output terminal Q2 configured to provide a first high side control signal HS1. In an embodiment, when the off time control signal TOFF is in the active state, the first low side control signal LS1 is in an active state (e.g., the logic high state), and the first high side control signal HS1 is an inactive state (e.g., the logic low state). When the on time control signal TON is in the active state, and the first low side control signal LS1 is in an inactive state (e.g., the logic low state), and the first high side control signal HS1 is in an active state (e.g., the logic high state).

The second RS flip-flop 205 may comprise a set terminal S configured to receive the off time control signal TOFF, a reset terminal R configured to receive the max on time control signal TONmax, a first output terminal Q1 configured to provide a second low side control signal LS2. In an embodiment, when the off time control signal TOFF is in the active state, the second low side control signal LS2 is in the inactive state (e.g., the logic low state). When the max on time control signal TONmax is in an active state, the second low side control signal LS2 is in an active state (e.g., the logic high state).

The first AND logic gate 206 may be configured to receive the enable signal EN and the first high side control signal HS1, and further configured to conduct a logic AND operation of the enable signal EN and the first high side control signal HS to generate the high side control signal HS.

It should be understood, when the step-up switching converter 100 is operated in a continuous conduction mode, the logic states of the high side control signal HS and the logic states of the low side control signal LS are complementary. However, when the step-up switching converter 100 is operated in a discontinuous conduction mode (DCM), the high side switch 12 should be turned off when the inductor current signal flowing through the inductor L is decreased to a zero-crossing threshold. In an embodiment, the zero-crossing threshold is equal to zero. Therefore, in such an application, the regular voltage regulation module 21 may further comprise a zero-crossing signal generator to generate a zero-crossing signal ZCD to denote whether the inductor current signal is decreased to the zero-crossing threshold. In such an application, the first control signal CTRL1 may comprise the on time control signal TON, the off time control signal TOFF, and the zero-crossing signal ZCD. Meanwhile, the first AND logic gate 206 may further be configured to receive the zero-crossing signal ZCD and to generate the high side control signal HS based on the enable signal EN, the first high side control signal HS1 and the zero-crossing signal ZCD.

The second AND logic gate 207 may be configured to receive the enable signal EN and the first low side control signal LS1, and further configured to conduct a logic AND operation of the enable signal EN and the first low side control signal LS1 to generate a third low side control signal LS3.

The third AND logic gate 208 may be configured to receive an inversing signal of the enable signal EN and the second low side control signal LS2, and further configured to conduct a logic AND operation of the inversing signal of the enable signal EN and the second low side control signal LS2 to generate a fourth low side control signal LS4.

The first OR logic gate 209 may be configured to receive the third low side control signal LS3 and the fourth low side control signal LS4, and further configured to conduct a logic OR operation of the third low side control signal LS3 and the fourth low side control signal LS4 to generate the low side control signal LS.

Figure 3:
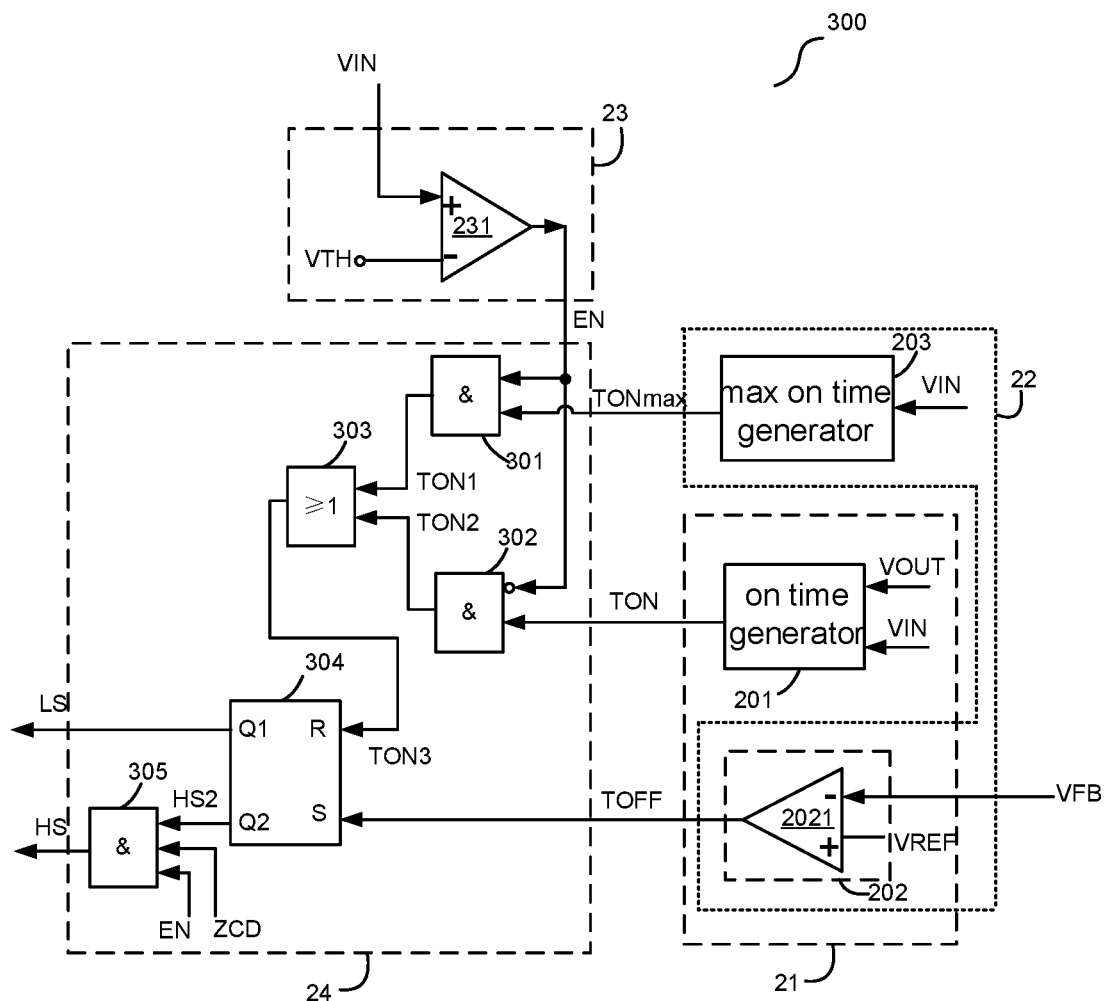
FIG. 3 schematically illustrates a step-up switching converter 300 in accordance with an embodiment of the present invention.

FIG. 3 schematically illustrates a step-up switching converter 300 in accordance with an embodiment of the present invention. Comparing with the step-up switching converter 200 of FIG. 2, the step-up switching converter 300 may comprise a different logic circuit 24.

As shown in FIG. 3, the logic circuit 24 of the step-up switching converter 300 may comprise a fourth AND logic gate 301, a fifth AND logic gate 302, a sixth AND logic gate 305, a second OR logic gate 303 and a third RS flip-flop 304.

The fourth AND logic gate 301 may be configured to receive the enable signal EN and the max on time control signal TONmax, and further configured to conduct a logic AND operation of the enable signal EN and the max on time control signal TONmax to generate a first on time control signal TON1.

The fifth AND logic gate 302 may be configured to receive an inversing signal of the enable signal EN and the on time control signal TON, and further configured to conduct a logic AND operation of the inversing signal of the enable signal EN and the on time control signal TON to generate a second on time control signal TON2.

The second OR logic gate 303 may be configured to receive the first on time control signal TON1 and the second on time control signal TON2, and further configured to conduct a logic OR operation of the first on time control signal TON1 and the second on time control signal TON2 to generate a third on time control signal TON3.

The third RS flip-flop 304 may comprise a set terminal S configured to receive the off time control signal TOFF, a reset terminal R configured to receive the third on time control signal TON3, a first output terminal Q1 to provide the low side control signal LS and a second output terminal Q2 to provide a second high side control signal HS2. In an embodiment, when the off time control signal TOFF is in the active state, the second high side control signal HS2 is in an inactive state (e.g., the logic low state); and when the third on time control signal TON3 is in the active state, the second high side control signal HS2 is in an active state (e.g., the logic high state).

The sixth AND logic gate 305 may be configured to receive the enable signal EN and the second high side control signal HS2, and further configured to conduct a logic AND operation of the enable signal EN and the second high side control signal HS2 to generate the high side control signal HS.

As mentioned above, it should be understood that when the step-up switching converter 100 is operated in DCM, the regular voltage regulation module 21 may further comprise the zero-crossing signal generator to generate the zero-crossing signal ZCD. In such an application, the first control signal CTRL1 may comprise the on time control signal TON, the off time control signal TOFF and the zero-crossing signal ZCD. The sixth AND logic gate 305 may further be configured to receive the zero-crossing signal ZCD, and further configured to generate the high side control signal HS based on the enable signal EN, the second high side control signal HS2 and the zero-crossing signal ZCD.

Figure 4:
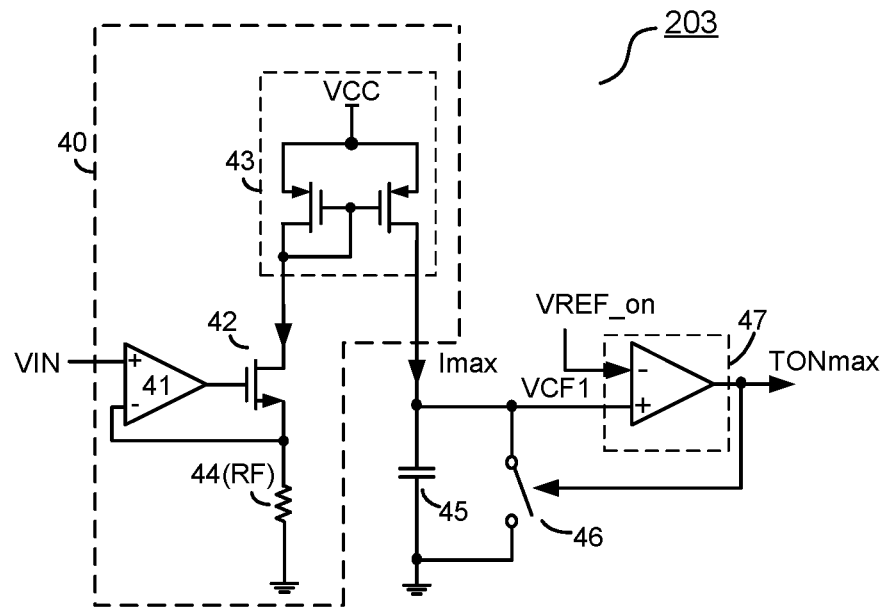
FIG. 4 schematically illustrates the max on time generator 203 of FIGS. 2 and 3 in accordance with an embodiment of the present invention.

FIG. 4 schematically illustrates the max on time generator 203 of FIGS. 2 and 3 in accordance with an embodiment of the present invention. In the exemplary embodiment of FIG. 4, the on time generator 203 may comprise a regulation current signal generator 40, a capacitor 45, a reset switch 46 and a comparator 47.

In an embodiment, the regulation current signal generator 40 may be configured to receive the input voltage signal VIN to generate a regulation current signal Imax.

In the exemplary embodiment of FIG. 4, the regulation current signal generator 40 may comprise an operational amplifier 41, a transistor 42, a current mirror 43 and a resistor 44 with a resistance RF. The operational amplifier 41 may have a first input terminal configured to receive the input voltage signal VIN, a second input terminal, and an output terminal. The transistor 42 may have a first terminal coupled to the second input terminal of the operational amplifier 41, a second terminal, and a control terminal coupled to the output terminal of the operational amplifier 41. The resistor 44 may be coupled between the first terminal of the transistor 42 and the logic ground. The current mirror 43 may have a first current terminal coupled to the second terminal of the transistor 42, a second current terminal operated as an output terminal of the regulation current signal generator 40 to provide the regulation current signal Imax. Herein, the regulation current signal Imax is equal to VIN/RF.

The capacitor 45 may be connected between the output terminal of the regulation current signal generator 40 and the logic ground. The regulation current signal Imax is configured to charge the capacitor 45 to generate a voltage signal VCF1 across the capacitor 45. The voltage comparator 47 may have a first input terminal configured to receive the voltage signal VCF1, a second input terminal configured to receive a reference voltage signal VREF_on, and an output terminal. The comparator 47 may be configured to compare the voltage signal VCF1 with the reference voltage signal VREF_on to generate the max on time control signal TONmax at its output terminal. The reset switch 46 may have a first input terminal coupled to the output terminal of the regulation current signal generator 40, a second input terminal connected to the logic ground, and a control terminal. In an embodiment, the control terminal of the reset switch 46 is controlled by the low side control signal LS. In such an application, when the low side control signal LS is in the active state (i.e., the low side switch 11 is turned on), the reset switch 46 is turned off so that the regulation current signal Imax may begin to charge the capacitor 45. When the low side control signal LS is in the inactive state (i.e., the low side switch 11 is turned off), the reset switch 46 is turned on so that the capacitor 45 is discharged through the reset switch 46. In an embodiment, the smaller the input voltage signal VIN is, the longer time the voltage signal VCF1 increases to be equal to the reference voltage signal VREF_on at the same resistance RF of the resistor 44, capacitance CF of capacitor 45 and potential of the reference voltage signal VREF_on. That is, the on time of the low side switch 11 is varied in the change of the input voltage signal VIN, and the smaller the input voltage signal VIN is, the longer the on time of the low side switch 11 is.

Figure 5:
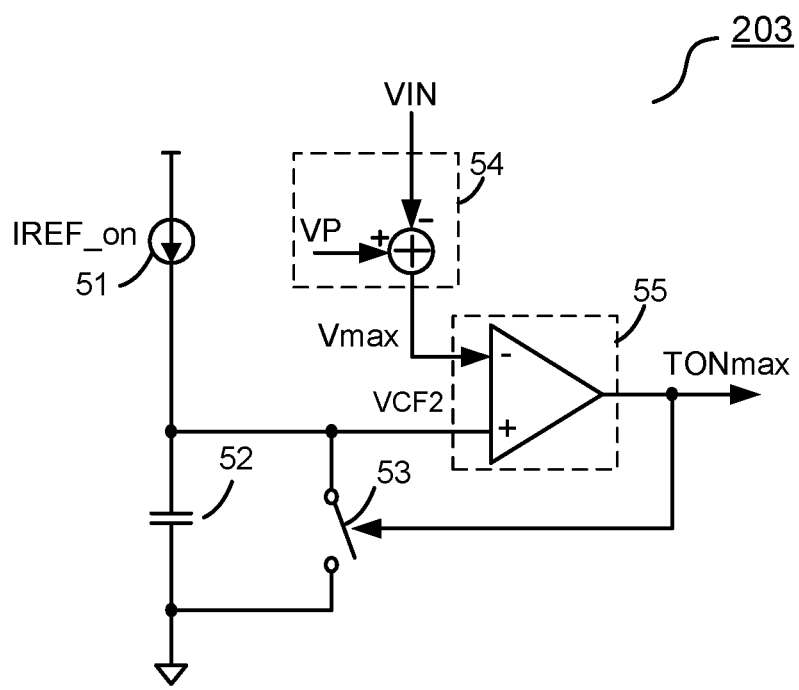
FIG. 5 schematically illustrates the max on time generator 203 of FIGS. 2 and 3 in accordance with other embodiments of the present invention.

FIG. 5 schematically illustrates the max on time generator 203 of FIGS. 2 and 3 in accordance with other embodiments of the present invention. In the exemplary embodiment of FIG. 5, the on time generator 203 may comprise a current source 51, a capacitor 52, a reset switch 53, a controlled voltage signal generator 54 and a comparator 55.

The capacitor 52 may be connected between the current source 51 and the logic ground. A current signal IREF_on provided by the current source 51 is configured to charge the capacitor 52 to generate a voltage signal VCF2 across the capacitor 52. The controlled voltage signal generator 54 may be configured to receive the input voltage signal VIN to generate a controlled voltage signal Vmax. In an embodiment, the potential of the controlled voltage signal Vmax is inversely proportion to the potential of the input voltage signal VIN, i.e., the smaller the input voltage signal VIN is, the larger the controlled voltage signal Vmax is, and vice versa. In an embodiment, the controlled voltage signal generator 54 may comprise a subtractor which is configured to subtract the input voltage signal VIN from a constant voltage signal VP to generate the controlled voltage signal Vmax., i.e., Vmax=VP−VIN. The voltage comparator 55 may have a first input terminal configured to receive the voltage signal VCF2, a second input terminal configured to receive the controlled voltage signal Vmax, and an output terminal. The comparator 55 may be configured to compare the voltage signal VCF2 with the controlled voltage signal Vmax to generate the max on time control signal TONmax at its output terminal. The reset switch 53 may have a first input terminal coupled to the current source 51, a second input terminal connected to the logic ground, and a control terminal. In an embodiment, the control terminal of the reset switch 53 is controlled by the low side control signal LS. In such an application, when the low side control signal LS is in the active state (i.e., the low side switch 11 is turned on), the reset switch 53 is turned off so that the current signal IREF_on may begin to charge the capacitor 52. When the low side control signal SL is in the inactive state (i.e., the low side switch 11 is turned off), the reset switch 53 is turned on so that the capacitor 52 is discharged through the reset switch 53. In an embodiment, for an unchanged resistance RF of the resistor 44, capacitance CF of capacitor 45 and potential of the reference voltage signal VREF_on, the smaller the input voltage signal VIN is, the longer time the voltage signal VCF2 increases to be equal to the controlled voltage signal Vmax. That is, the on time of the low side switch 11 is varied in the change of the input voltage signal VIN, and the smaller the input voltage signal VIN is, the longer the on time of the low side switch 11 is.

Figure 6:
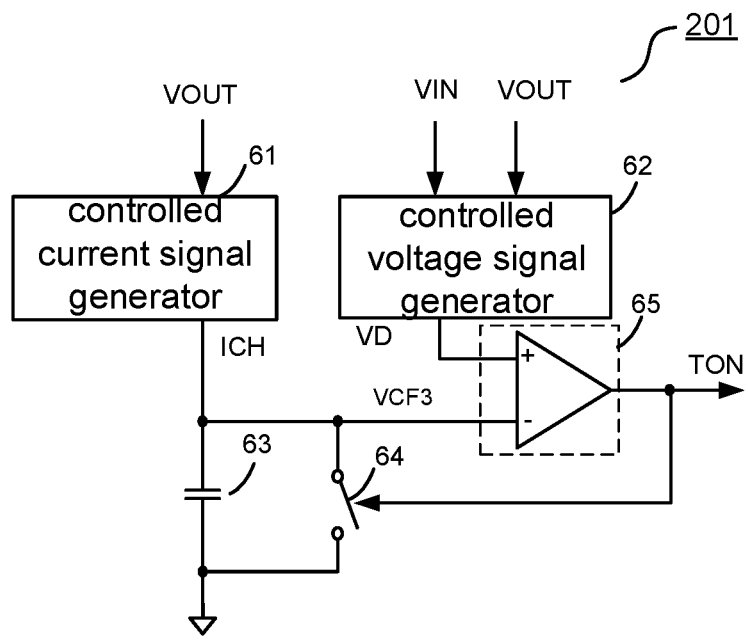
FIG. 6 schematically illustrates the on time generator 201 of FIGS. 2 and 3 in accordance with an embodiment of the present invention.

FIG. 6 schematically illustrates the on time generator 201 of FIGS. 2 and 3 in accordance with an embodiment of the present invention. In the exemplary embodiment of FIG. 6, the on time generator 201 may comprise a controlled current signal generator 61, a controlled voltage signal generator 62, a capacitor 63, a reset switch 64 and a comparator 65.

The controlled current signal generator 61 may be configured to receive the output voltage signal VOUT to generate a charging current signal ICH. In an embodiment, the value of the charging current signal ICH is proportional to the potential of the input voltage signal VIN. The capacitor 63 may be connected between an output terminal of the controlled current signal generator 61 and the logic ground. The charging current signal ICH is configured to charge the capacitor 63 to generate a voltage signal VCF3 across the capacitor 63. The controlled voltage signal generator 62 may be configured to receive the input voltage signal VIN and the output voltage signal VOUT to generate a controlled voltage signal VD. In an embodiment, the controlled voltage signal VD is proportional to a difference of the output voltage signal VOUT and the input voltage signal VIN (i.e., VOUT−VIN). The voltage comparator 65 may have a first input terminal configured to receive the controlled voltage signal VD, a second input terminal configured to receive the voltage signal VCF3, and an output terminal. The comparator 65 may be configured to compare the controlled voltage signal VD with the voltage signal VCF3 to generate the on time control signal TON at its output terminal. The reset switch 64 may have a first input terminal coupled to the output terminal of the controlled current signal generator 61, a second input terminal connected to the logic ground, and a control terminal. In an embodiment, the control terminal of the reset switch 64 is controlled by the low side control signal LS. In such an application, when the low side control signal LS is in the active state (i.e., the low side switch 11 is turned on), the reset switch 64 is turned off so that the charging current signal ICH may begin to charge the capacitor 63. When the low side control signal LS is in the inactive state (i.e., the low side switch 11 is turned off), the reset switch 64 is turned on so that the capacitor 63 is discharged through the reset switch 64. As can be appreciated, the embodiments illustrated in FIGS. 2 and 3, and 6 are dedicated exemplary embodiments in which the on time control signal TON is relevant with the input voltage signal VIN and the output voltage signal VOUT. In other embodiments, such as the regular COT controlled scheme, the on time control signal TON may be irrelevant with the input voltage signal VIN and the output voltage signal VOUT. For example, the controlled current signal generator 61 and the controlled voltage signal generator 62 may respectively receive the power supply voltage signal VCC to generate the on time control signal TON.

Figure 7:
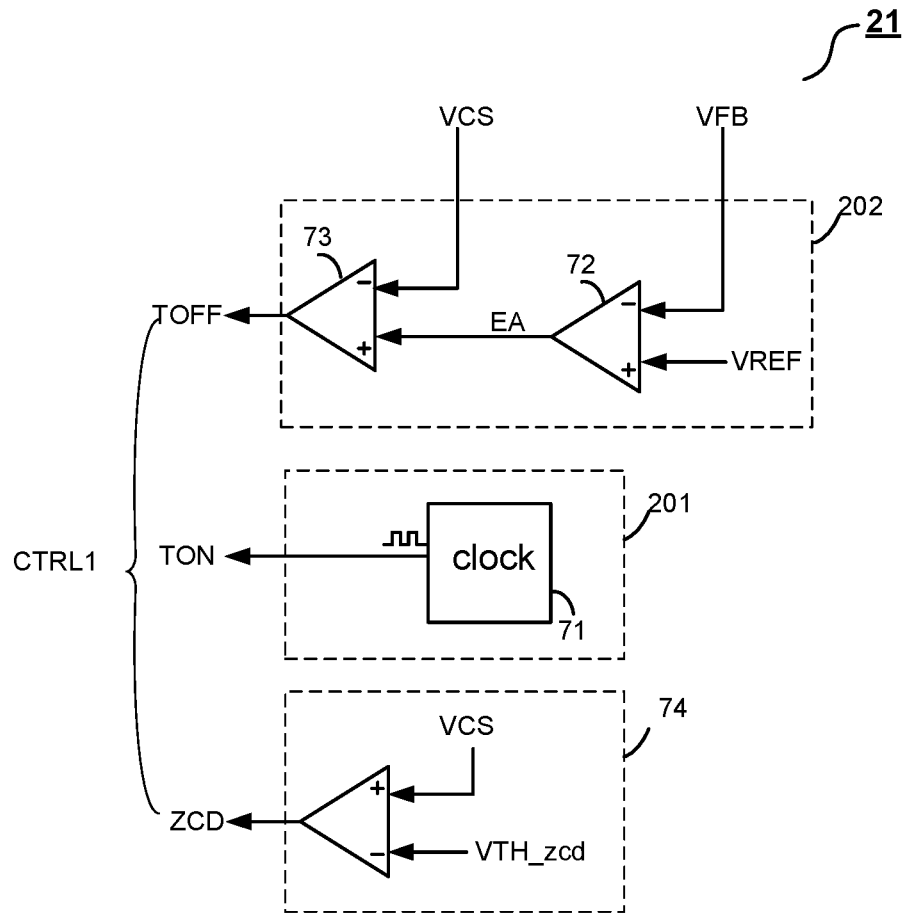
FIG. 7 schematically illustrates the regular voltage regulation module 21 of FIGS. 2 and 3 in accordance with an embodiment who has an average current controlled scheme.

As can be appreciated, the schematic diagrams of the regular voltage regulation module 21 of FIGS. 2 and 3 are embodiments for illustrating COT controlled schemes. In other embodiments, the regular voltage regulation module 21 may comprise other suitable modules and elements for realizing different voltage and current regulation schemes to generate the first control signal CTRL1 to regulate the output voltage signal VOUT. For instance, FIG. 7 schematically illustrates the regular voltage regulation module 21 of FIGS. 2 and 3 in accordance with an embodiment who has an average current controlled scheme. In such an embodiment, the first control signal CTRL1 may comprise the on time control signal TON, the off time control signal TOFF and the zero-crossing signal ZCD, and the regular voltage regulation module 21 may comprise the on time generator 201 configured to provide the on time control signal TON, the off time generator 202 configured to provide the off time control signal TOFF and the zero-crossing signal generator 74 configured to provide the zero-crossing signal ZCD.

As shown in FIG. 7, the on time generator 201 may comprise a clock signal generator 71 configured to provide a clock signal operated as the on time control signal TON.

The off time generator 202 may comprise an error amplifier 72 and a current comparator 73. In an embodiment, the error amplifier 72 may have a first input terminal, a second input terminal and an output terminal. The first input terminal of the error amplifier 72 may be configured to receive the voltage feedback signal VFB. The second input terminal of the error amplifier 72 may be configured to receive the reference signal VREF. The error amplifier 72 may be configured to amplify the difference of the voltage feedback signal VFB and the reference signal VREF to provide an error signal EA at its the output terminal. The current comparator 73 may have a first input terminal, a second input terminal and an output terminal. The first input terminal of the current comparator 73 may be configured to receive the error signal EA. The second input terminal of the current comparator 73 may be configured to receive a current sensing signal VCS indicative of the inductor current signal flowing through the inductor L. The current comparator 73 may be configured to compare the error signal EA with the current sensing signal VCS to provide the off time control signal TOFF at its output terminal. In an embodiment, the zero-crossing signal generator 74 may be configured to receive the current sensing signal VCS and a zero-crossing threshold VTH_zcd, and further configured to compare the current sensing signal VCS with the zero-crossing threshold VTH_zcd to generate the zero-crossing signal ZCD. As can be appreciated, the regular voltage regulation module 21 in the exemplary embodiment of FIG. 7 may be combined with the ultra-low voltage regulation module 22 and the logic circuit 23 of FIGS. 2 and 3 to generate the high side control signal HS and the low side control signal LS.

Figure 8:
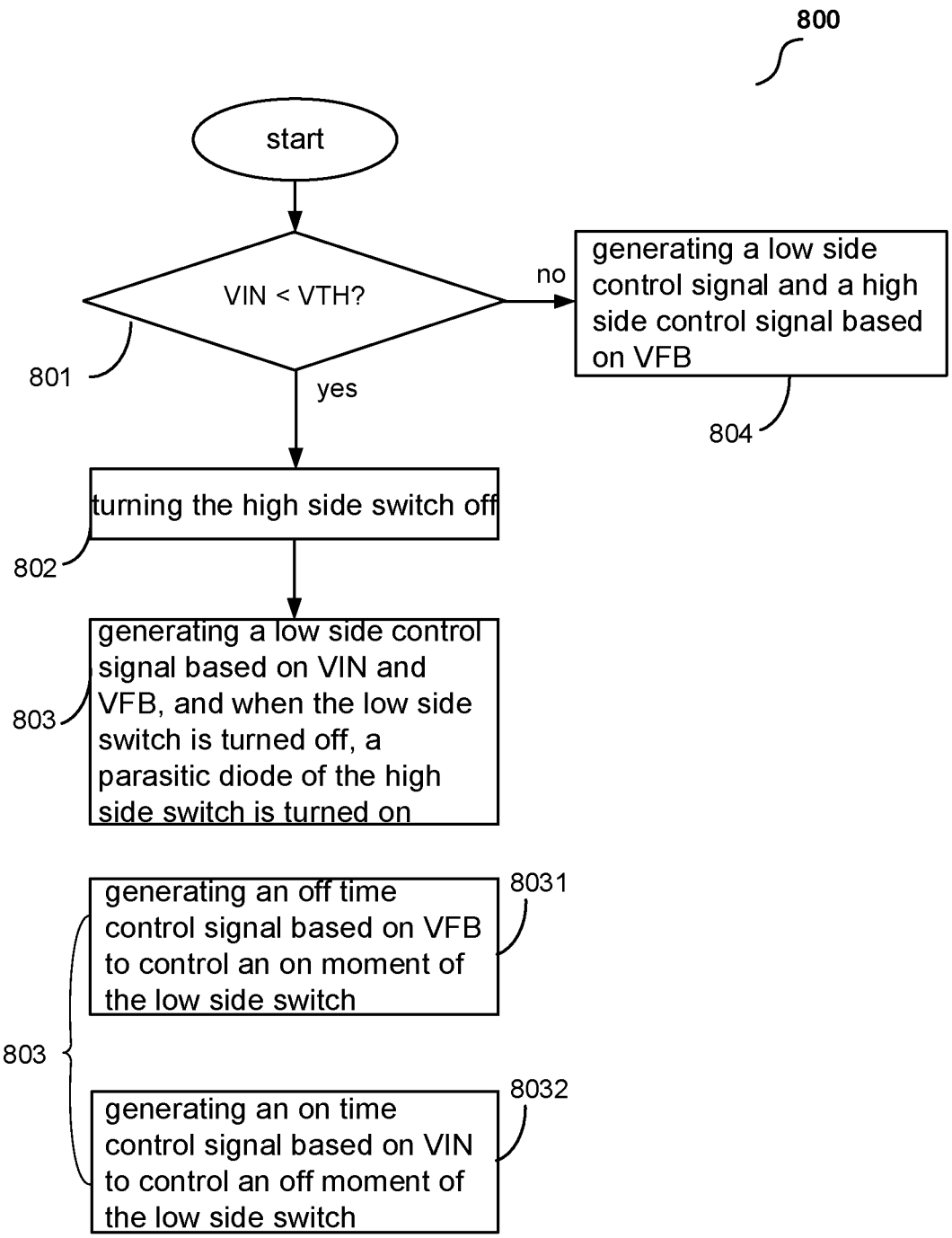
FIG. 8 illustrates a control method 800 for a step-up switching converter in accordance with an embodiment of the present invention.

FIG. 8 illustrates a control method 800 for a step-up switching converter in accordance with an embodiment of the present invention. The control method 800 can be carried out in the embodiments of this application mentioned above with reference to FIGS. 1-7. The control method 800 may comprise steps 801-804.

In step 801, determining whether the input voltage signal VIN is smaller than the ultra-low voltage threshold VTH. If the input voltage signal VIN is smaller than the ultra-low voltage threshold VTH, continues with step 802, otherwise, turns to step 804.

In step 802, turning the high side switch 12 off. In an embodiment, the high side switch 12 may comprise a parasitic diode having the current direction only allowing a current signal flowing through the input terminal of the step-up switching converter to the output terminal of the step-up switching converter.

In step 803, generating the low side control signal LS based on the input voltage signal VIN and the voltage feedback signal VFB to control the low side switch 11 to perform on and off switching. In an embodiment, when the low side switch 11 is turned off, the inductor current signal IL is freewheeling through the parasitic diode 1201 of the high side switch 12. In an embodiment, the step 803 may comprise a step 8031 and a step 8032.

In step 8031, generating the off time control signal TOFF based on the voltage feedback signal VFB to control an on moment of the low side switch 11.

In step 8032, generating the max on time control signal TON based on the input voltage signal VIN to control an off moment of the low side switch 11. In an embodiment, the duration of the on time of the low side switch 11 is increased with decrease of the potential of the input voltage signal VIN, i.e., the smaller the input voltage signal VIN is, the longer the on time of the low side switch 11 is.

In step 804, generating the low side control signal LS and the high side control signal HS based on the voltage feedback signal VFB to control the low side switch 11 and the high side switch 12 to perform on and off switching.

It should be understood that in the exemplary embodiment of FIG. 8, although the step 803 is arranged after the step 802, actually, the step 802 and the step 803 may be happened synchronously. Similarly, although the step 8032 is arranged after the step 8031, actually, the step 8031 and the step 8032 may be happened synchronously.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What I claim is:

1. A control circuit for controlling a step-up switching converter, the control circuit comprising:
    a regular voltage regulation module, configured to receive a voltage feedback signal indicative of an output voltage signal of the step-up switching converter to generate a first control signal; and
    an ultra-low voltage regulation module, configured to receive the voltage feedback signal and an input voltage signal of the step-up switching converter to generate a second control signal; wherein
    when the input voltage signal is larger than an ultra-low voltage threshold, the first control signal is configured to control a high side switch and a low side switch of the step-up switching converter to perform on and off switching; and wherein
    when the input voltage signal is smaller than the ultra-low voltage threshold, the second control signal is configured to turn the high side switch off and to control the low side switch to perform on and off switching, and wherein when the low side switch is turned off, a parasitic diode of the high side switch is turned on.

2. The control circuit of claim 1, wherein when the input voltage signal is smaller than the ultra-low voltage threshold, a duration of on time of the low side switch is increased with decrease of the potential of the input voltage signal.

3. The control circuit of claim 1, wherein the parasitic diode of the high side switch has a current direction allowing a current signal flowing through an input terminal of the step-up switching converter to an output terminal of the step-up switching converter.

4. The control circuit of claim 1, wherein the control circuit further comprises:
    a mode determining circuit, configured to receive the input voltage signal, and further configured to compare the input voltage signal with the ultra-low voltage threshold to generate an enable signal.

5. The control circuit of claim 4, wherein the control circuit further comprises:
    a logic circuit, configured to receive the enable signal, the first control signal and the second control signal, and further configured to conduct a logic operation of the enable signal, the first control signal and the second control signal to generate a high side control signal configured to control the high side switch on and off, and a low side control signal configured to control the low side switch on and off.

6. The control circuit of claim 1, wherein the first control signal comprises an on time control signal and an off time control signal, and wherein the regular voltage regulation module comprises:
    an off time generator, configured to receive the voltage feedback signal and a desired reference signal, and further configured to compare the voltage feedback signal with the desired reference signal to generate the off time control signal; and
    an on time generator, configured to receive the input voltage signal and the output voltage signal, and further configured to generate the on time control signal based on the input voltage signal and the output voltage signal.

7. The control circuit of claim 6, wherein the second control signal comprises a max on time control signal and the off time control signal, and wherein the ultra-low voltage regulation module comprises:
the off time generator of claim 6; and
a max on time generator, configured to receive the input voltage signal, and further configured to generate the max on time control signal based on the input voltage signal.

8. The control circuit of claim 7, wherein the max on time generator comprises:
a regulation current signal generator, configured to receive the input voltage signal to generate a regulation current signal;
a first capacitor, connected between an output terminal of the regulation current generator and a logic ground;
a first voltage comparator, configured to compare a reference voltage signal with a voltage signal across the first capacitor to generate the max on time signal; and
a first reset switch, having a first terminal coupled to the output terminal of the regulation current signal generator, a second terminal connected to the logic ground, and a control terminal configured to receive a low side control signal, wherein the low side control signal is also configured to control the low side switch on and off.

9. The control circuit of claim 7, wherein the max on time generator comprises:
a current source;
a second capacitor, connected between the current source and a logic ground;
a first controlled voltage generator, configured to receive the input voltage signal to generate a first controlled voltage signal;
a second voltage comparator, configured to compare the first controlled voltage signal with a voltage signal across the second capacitor to generate the max on time signal; and
a second reset switch, having a first terminal coupled to the current source, a second terminal connected to the logic ground, and a control terminal configured to receive a low side control signal, wherein the low side control signal is also configured to control the low side switch on and off.

10. The control circuit of claim 7, wherein the control circuit further comprises a logic circuit, and wherein the logic circuit comprises:
a first RS flip-flop, having a set terminal receiving the off time control signal, a reset terminal receiving the on time control signal, a first output terminal providing a first low side control signal and a second output terminal providing a first high side control signal;
a second RS flip-flop, having a set terminal receiving the off time control signal, a reset terminal receiving the max on time control signal, an output terminal providing a second low side control signal;
a first AND logic gate, configured to receive the enable signal and the first high side control signal to generate a high side control signal, wherein the high side control signal is configured to control the high side switch on and off;
a second AND logic gate, configured to receive the enable signal and the first low side control signal to generate a third low side control signal;
a third AND logic gate, configured to receive an inversing signal of the enable signal and the second low side control signal to generate a fourth low side control signal; and a first OR logic gate, configured to receive the third low side control signal and the fourth low side control signal to generate a low side control signal, wherein the low side control signal is configured to control the low side switch on and off.

11. The control circuit of claim 7, wherein the control circuit further comprises a logic circuit, and wherein the logic circuit comprises:
a fourth AND logic gate, configured to receive the enable signal and the max on time control signal to generate a first on time control signal;
a fifth AND logic gate, configured to receive an inversing signal of the enable signal and the on time control signal to generate a second on time control signal;
a second OR logic gate, configured to receive the first on time control signal and the second on time control signal to generate a third on time control signal; and
a third RS flip-flop, having a set terminal configured to receive the off time control signal, a reset terminal configured to receive the third on time control signal, a first output terminal configured to provide a low side control signal to control the low side switch on and off, and a second output terminal configured to provide a second high side control signal; and
a sixth AND logic gate, configured to receive the enable signal and the second high side control signal to generate a high side control signal to control the high side switch on and off.

12. The control circuit of claim 6, wherein the first control signal further comprises a zero-crossing signal, and wherein the regular voltage regulation module further comprises:
a zero-crossing signal generator, configured to receive a current sensing signal indicative of a current signal flowing through the high side switch and a zero-crossing threshold, and further configured to compare the current sensing signal with the zero-crossing threshold to generate the zero-crossing signal.

13. The control circuit of claim 6, wherein the ON time generator comprises:
a controlled current generator, configured to receive the output voltage signal to generate a controlled current signal;
a third capacitor, connected between an output terminal of the controlled current generator and a logic ground;
a second controlled voltage generator, configured to receive the input voltage signal and the output voltage signal to generate a second controlled voltage signal;
a third voltage comparator, configured to compare the second controlled voltage signal with a voltage signal across the third capacitor to generate the on time signal; and
a third reset switch, having a first terminal coupled to an output terminal of the controlled current generator, a second terminal connected to the logic ground, and a control terminal receive a low side control signal, wherein the low side control signal is also configured to control the low side switch on and off.

14. A step-up switching converter, comprising:
a high side switch and a low side switch;
a regular voltage regulation module, configured to receive a voltage feedback signal indicative of an output voltage signal of the step-up switching converter to generate a first control signal; and
an ultra-low voltage regulation module, configured to receive the voltage feedback signal and an input voltage signal of the step-up switching converter to generate a second control signal; wherein when the input voltage signal is larger than an ultra-low voltage threshold, the first control signal is configured to control the high side switch and the low side switch to perform on and off switching; and wherein when the input voltage signal is smaller than the ultra-low voltage threshold, the second control signal is configured to turn the high side switch off and to control the low side switch to perform on and off switching, and wherein when the low side switch is turned off, a parasitic diode of the high side switch is turned on.

15. The step-up switching converter of claim 14, wherein when the input voltage signal is smaller than the ultra-low voltage threshold, a duration of on time of the low side switch is increased with decrease of a potential of the input voltage signal.

16. A control method for controlling a step-up switching converter, the control method comprising:

determining whether an input voltage signal of the step-up switching converter is smaller than an ultra-low voltage threshold;

generating a first control signal based on a voltage feedback signal indicative of an output voltage signal of the step-up switching converter when the input voltage signal is larger than the ultra-low voltage threshold, wherein the first control signal is configured to control a high side switch and a low side switch of the step-up switching converter to perform on and off switching; and generating a second control signal based on the voltage feedback signal and the input voltage signal when the input voltage signal is smaller than the ultra-low voltage threshold, wherein the second control signal is configured to turn the high side switch off and to control the low side switch to perform on and off switching, and wherein when the low side switch is turned off, a parasitic diode of the high side switch is turned on.

17. The control circuit of claim 16, wherein when the input voltage signal is smaller than the ultra-low voltage threshold, a duration of on time of the low side switch is increased with decrease of a potential of the input voltage signal.

18. The control circuit of claim 16, wherein the step of generating the second control signal based on the voltage feedback signal and the input voltage signal comprising:

generating an off time control signal based on the voltage feedback signal to control an on moment of the low side switch; and generating an on time control signal based on the input voltage signal to control an off moment of the low side switch.

* * * * *